United States Patent
Ruberg

(10) Patent No.: US 6,895,588 B1
(45) Date of Patent: *May 17, 2005

(54) REMOTE DEVICE ACCESS OVER A NETWORK

(75) Inventor: Alan T. Ruberg, Foster City, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/289,789

(22) Filed: Apr. 9, 1999

(51) Int. Cl.⁷ .............................................. G06F 13/10
(52) U.S. Cl. ...................... 719/321; 719/316; 709/223; 709/225
(58) Field of Search ............................. 719/316, 321; 709/223, 225, 321

(56) References Cited

U.S. PATENT DOCUMENTS

| | | | |
|---|---|---|---|
| 5,832,513 A | * 11/1998 | Kennedy | 707/202 |
| 5,870,610 A | 2/1999 | Beyda | 395/712 |
| 5,926,636 A | * 7/1999 | Lam et al. | 709/313 |
| 5,974,444 A | * 10/1999 | Konrad | 709/203 |
| 6,085,227 A | * 7/2000 | Edlund | 709/203 |
| 6,101,555 A | * 8/2000 | Goshey | 709/321 |
| 6,223,289 B1 | * 4/2001 | Wall et al. | 713/201 |
| 6,311,228 B1 | * 10/2001 | Ray | 709/321 |
| 6,546,419 B1 | * 4/2003 | Humpleman et al. | 709/223 |
| 6,549,934 B1 | * 4/2003 | Peterson et al. | 709/203 |

\* cited by examiner

*Primary Examiner*—Meng-Al T. An
*Assistant Examiner*—Li B. Zhen
(74) *Attorney, Agent, or Firm*—Martine Penilla & Gencarella, LLP

(57) ABSTRACT

The present invention provides a method for devices to be remotely accessed over a network. A remote device drive is coupled to a bus device driver at a network client. The remote device driver communicates to a remote bus proxy to a driver service in the server domain. A device manager provides responsibility for discovering services on network clients, enabling driver services to use the devices, notifying other driver services of the availability of devices, notifying clients of the permission to use a device by a service, and tracking connected devices.

31 Claims, 5 Drawing Sheets

DEVICE MANAGEMENT ARCHITECTURE

REMOTE DEVICE ACCESS OVER A NETWORK

BACKGROUND OF THE INVENTION

1. Field of the Invention

This invention relates to the field of computer systems.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java, JavaBeans, HotJava and all Java-based trademarks and logos are trademarks or registered trademarks of Sun Microsystems, Inc. in the United States and other countries.

2. Background Art

Computer systems often include additional devices used to provide additional functionality. These devices, often called "peripheral" devices, can include keyboards, printers, scanners, network interface and graphics cards, modems, monitors, cameras, and sound input devices. Generally, a device driver is used to control the peripheral device. In some network environments, the traditional device driver may not operate correctly. This problem can be understood by a review of peripheral devices.

Peripheral devices are often connected to a computer system through an expansion bus. An expansion bus allows the processor of a computer system (via software running on the processor), main memory, and other hardware associated with a computer system to control peripheral hardware devices external to the computer system. An expansion bus consists of conductors for data and control signals, along with hardware support logic chips and possibly firmware. There are a variety of expansion buses such as ISA (Industry Standard Architecture), PCI (Peripheral Component Interconnect), S-Bus, VME bus, etc. Each expansion bus defines a certain protocol by which devices that are on the bus are accessed.

A device driver is software used to control a peripheral device that is coupled with the computer system on the bus. A device driver is a program that controls a particular type of device that is attached to your computer. There are device drivers for printers, displays, CD-ROM readers, diskette drives, and so on. Many device drivers are built into an operating system. New device drivers are needed for devices for which the operating system does not already have drivers. A device driver converts the more general input/output instructions of the operating system to messages that the device type can understand. In many computer systems device drivers exist as a dynamic link library (DLL) file.

FIG. 1 illustrates symbolically the interrelation of devices, device drivers, and application programs. Devices, such as devices A and B, communicate through a bus (such as an expansion bus) to system software. The system software includes device drivers (device driver A and device driver B, respectively) implemented in the system software kernel. Applications can access the devices through the system software kernel and the appropriate device drivers.

A problem can arise where, in some network environments, a peripheral device may not be coupled directly to the computer system through the bus, but rather through a network connection, via a so called "thin" or "ultra-thin" client. For example, in an environment with a thin or ultra-thin client, it may not be possible to embed device-specific code, such as device drivers, for the large number of devices available.

SUMMARY OF THE INVENTION

The present invention provides a method for devices to be remotely accessed over a network. A remote device driver is coupled to a bus device driver at a network client. The remote device driver communicates to a remote bus proxy to a driver service in the server domain. A device manager provides responsibility for discovering services on network clients, enabling driver services to use the devices, notifying other driver services of the availability of devices, notifying clients of the permission to use a device by a service, and tracking connected devices.

DETAILED DESCRIPTION OF THE INVENTION

The invention is a method and apparatus for accessing remote devices. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Virtual Desktop System Architecture

One environment in which the present invention may be applied is in a virtual desktop system. One example of such a computer system is described in U.S. patent application Ser. No. 09/063,335 filed Apr. 20, 1998 and entitled "Method and Apparatus for Providing a Virtual Desktop System Architecture". In such a system, their is provided a central office metaphor to computing, where features and functions are provided by one or more servers and communicated to an appliance terminal through a network. Data providers are defined as "services" and are provided by one or more processing resources. The services communicate to display terminals through a network, such as Ethernet. The terminals are configured to display data, and to send keyboard, cursor, audio, and video data through the network to the processing server. Functionality is partitioned so that databases, server and graphical user interface functions are provided by the services, and human interface functionality is provided by the terminal. Communication with the terminals from various services is accomplished by converting disparate output to a common protocol. Appropriate drivers are provided for each service to allow protocol conversion. Multiple terminals are coupled to the network. Users can enable their unique session at any one of the terminals by logging in such as by inserting a "smart card" into a card reader. Removing the card disables the session. Re-inserting the card into the same or any other terminal re-enables the session.

In the computer system described above, the interfaces for peripheral devices coupled to the human interface terminal appear over a network protocol and do not involve operating system device drivers in the traditional sense.

Figure 3:
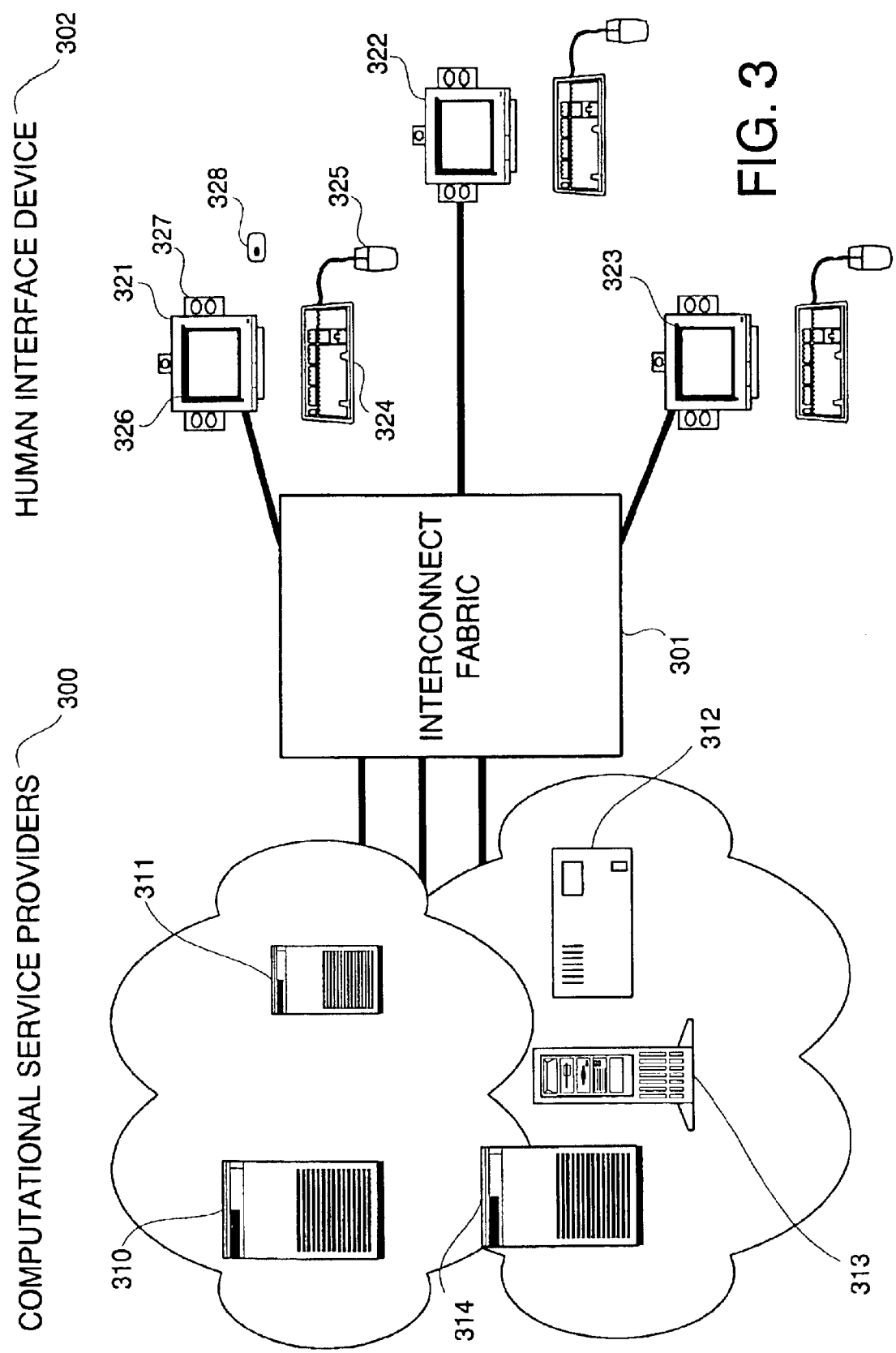
FIG. 3 illustrates the virtual desktop environment of the present invention.

In this system the functionality of the system is partitioned between a display and input device, and data sources or services. The display and input device is a human interface device (HID). The partitioning of this system is such that state and computation functions have been removed from the HID and reside on data sources or services. In one embodiment of the invention, one or more services communicate with one or more HIDs through some interconnect fabric, such as a network. An example of such a system is illustrated in FIG. 3. Referring to FIG. 3, the system consists of computational service providers 300 communicating data through interconnect fabric 301 to HIDs 302.

Computational Service Providers

Figure 1:
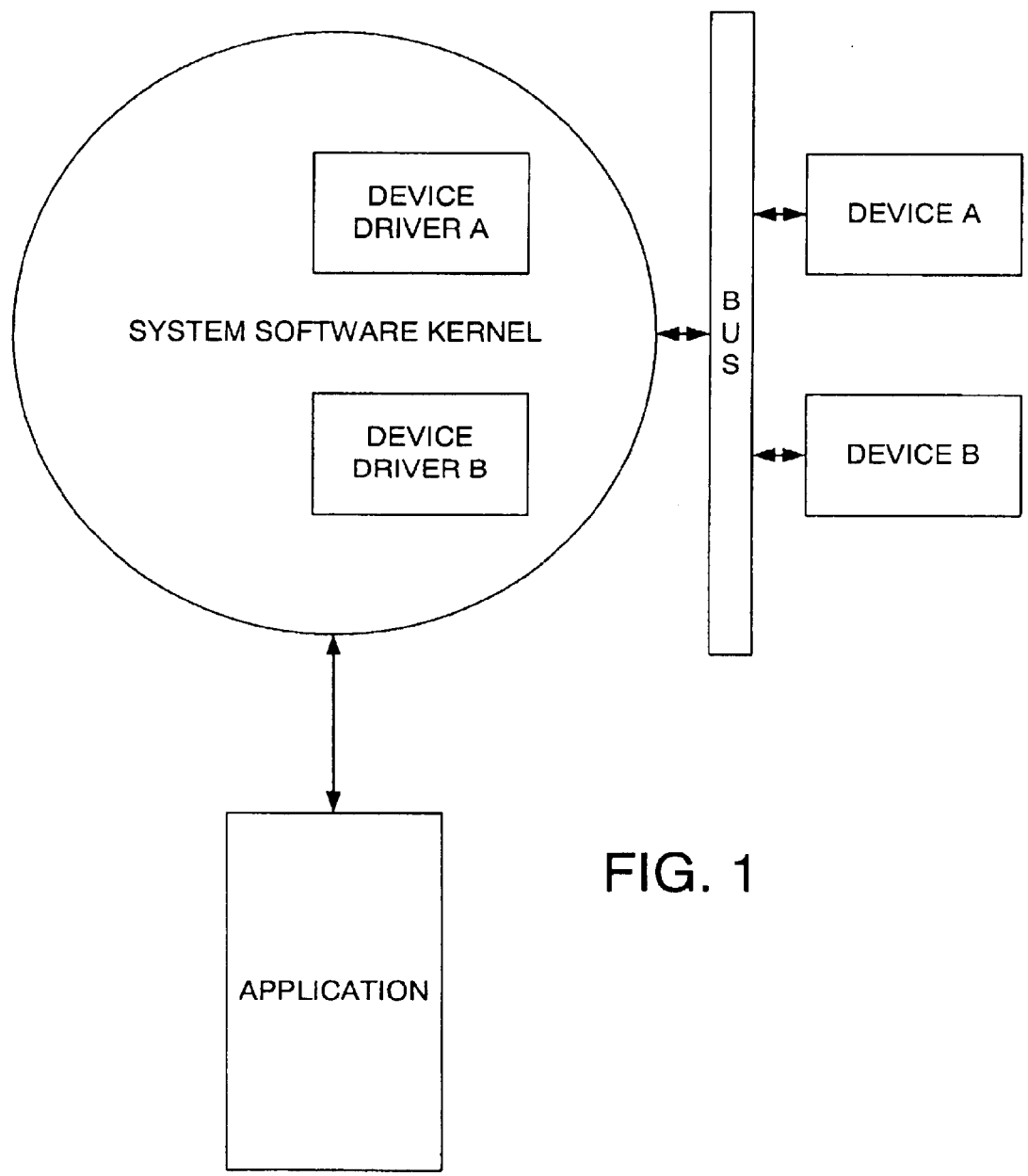
FIG. 1 illustrates the relationship of devices, device drivers, and application programs.

In the HID system, the computational power and state maintenance is found in the service providers, or services. The services are not tied to a specific computer, but may be distributed over one or more traditional desktop systems such as described in connection with FIG. 1, or with traditional servers. One computer may have one or more services, or a service may be implemented by one or more computers. The service provides computation, state, and data to the HIDs and the service is under the control of a common authority or manager. In FIG. 3, the services are found on computers 310, 311, 312, 313, and 314. It is important to note that the central data source can also be providing data that comes from outside of the central data source, such as for example, the internet or world wide web. The data source could also be broadcast entities such as those that broadcast data such as television or radio signals.

Examples of services include X11/Unix services, archived or live audio or video services, Windows NT service, Java™ program execution service, and others. A service herein is a process that provides output data and responds to user requests and input.

It is the responsibility of the service to handle communications with the HID that is currently being used to access the given service. This involves taking the output from the computational service and converting it to a standard protocol for the HID. This data protocol conversion is handled in one embodiment of the invention by a middleware layer, such as the X11 server, the Microsoft Windows interface, a video format transcoder, the OpenGL interface, or a variant of the java.awt.graphics class) within the service producer machine. The service machine handles the translation to and from the virtual desktop architecture wire protocol.

In an embodiment of the invention, each service is provided by a computing device optimized for its performance. For example, an Enterprise class machine could be used to provide X11/Unix service, a Sun MediaCenter could be used to provide video service, a Hydra based NT machine could provide applet program execution service.

The service producing computer systems connect directly to the HIDs through the interconnect fabric. It is also possible for the service producer to be a proxy for another device providing the computational service, such as a database computer in a three tiered architecture, where the proxy computer might only generate queries and execute user interface code.

Interconnection Fabric

In the invention, the interconnection fabric is any of multiple suitable communication paths for carrying data between the services and the HIDs. In one embodiment the interconnect fabric is a local area network implemented as an Ethernet network. Any other local network may also be utilized. The invention also contemplates the use of wide area networks, the internet, the world wide web, and others. The interconnect fabric may be implemented with a physical medium such as a wire or fiber optic cable, or it may be implemented in a wireless environment.

In one embodiment of the invention, the interconnect fabric provides actively managed, low-latency, high-bandwidth communications between the HID and the services being accessed. One embodiment contemplates a single-level, switched network, with cooperative (as opposed to competing) network traffic. Dedicated or shared communications interconnects may be used in the present invention.

Human Interface Devices

The HID is the means by which users access the computational services provided by the services. FIG. 3 illustrates HIDs 321, 322, and 323. A HID consists of a display 326, a keyboard 324, mouse 325, and audio speakers 327. The HID includes the electronics need to interface these devices to the interconnection fabric and to transmit to and receive data from the services.

Figure 4:
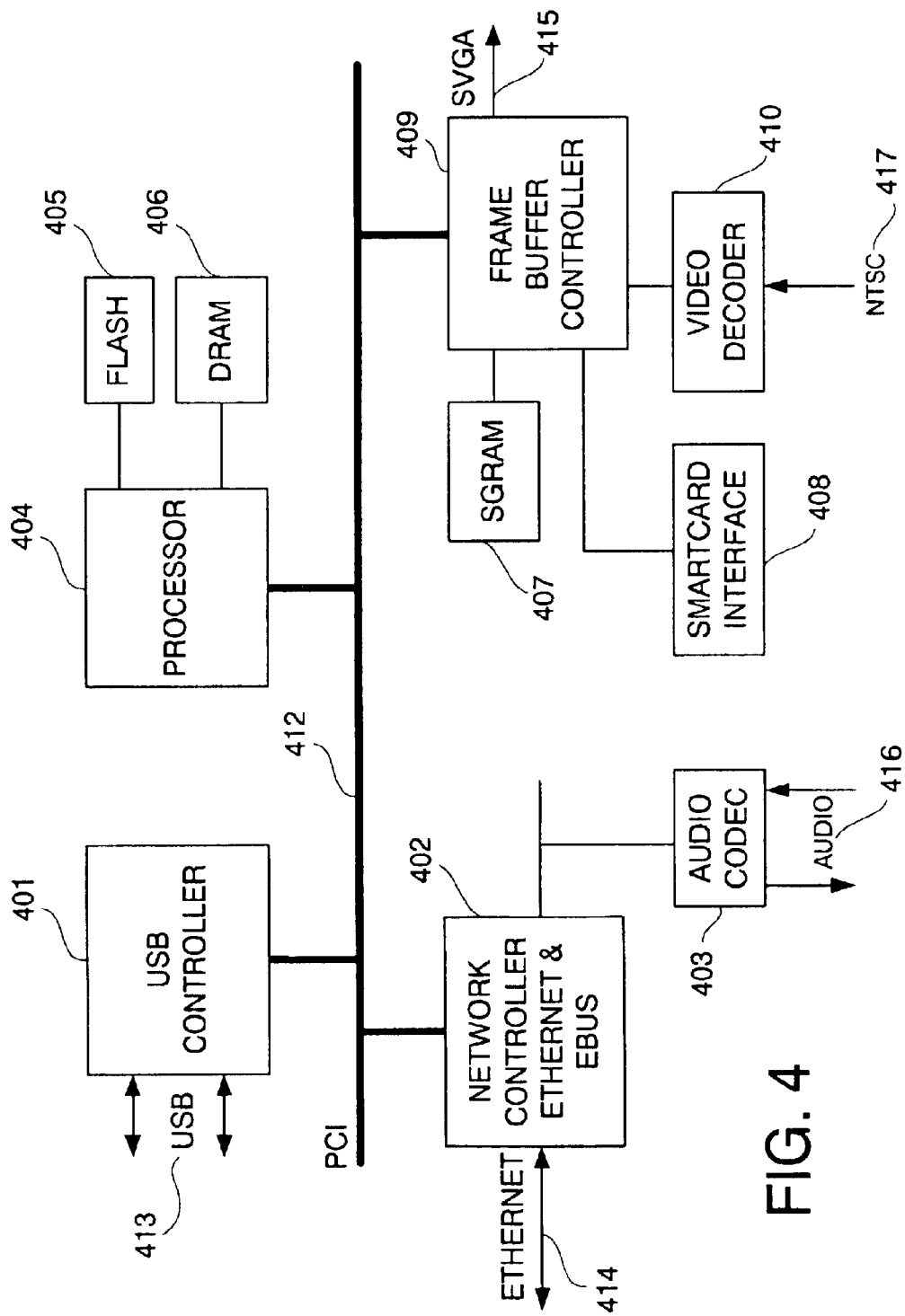
FIG. 4 is a block diagram of one embodiment of an HID of the present invention.

A block diagram of the HID is illustrated in FIG. 4. The components of the HID are coupled internally to a PCI bus 412. A network control block 402 communicates to the interconnect fabric, such as an ethernet, through line 414. An audio codec 403 receives audio data on interface 416 and is coupled to block 402. USB data communication is provided on lines 413 to USB controller 401.

An embedded processor 404 may be, for example, a Sparc2ep with coupled flash memory 405 and DRAM 406. The USB controller 401, network controller 402 and embedded processor 404 are all coupled to the PCI bus 412. Also coupled to the PCI 412 is the video controller 409. The video controller 409 may be for example, and ATI Rage128 frame buffer controller (or any other suitable controller) that provides SVGA output on line 415. NTSC or PAL data is provided into video controller through video decoder 410. A smartcard interface 408 may also be coupled to the video controller 409.

Figure 5:
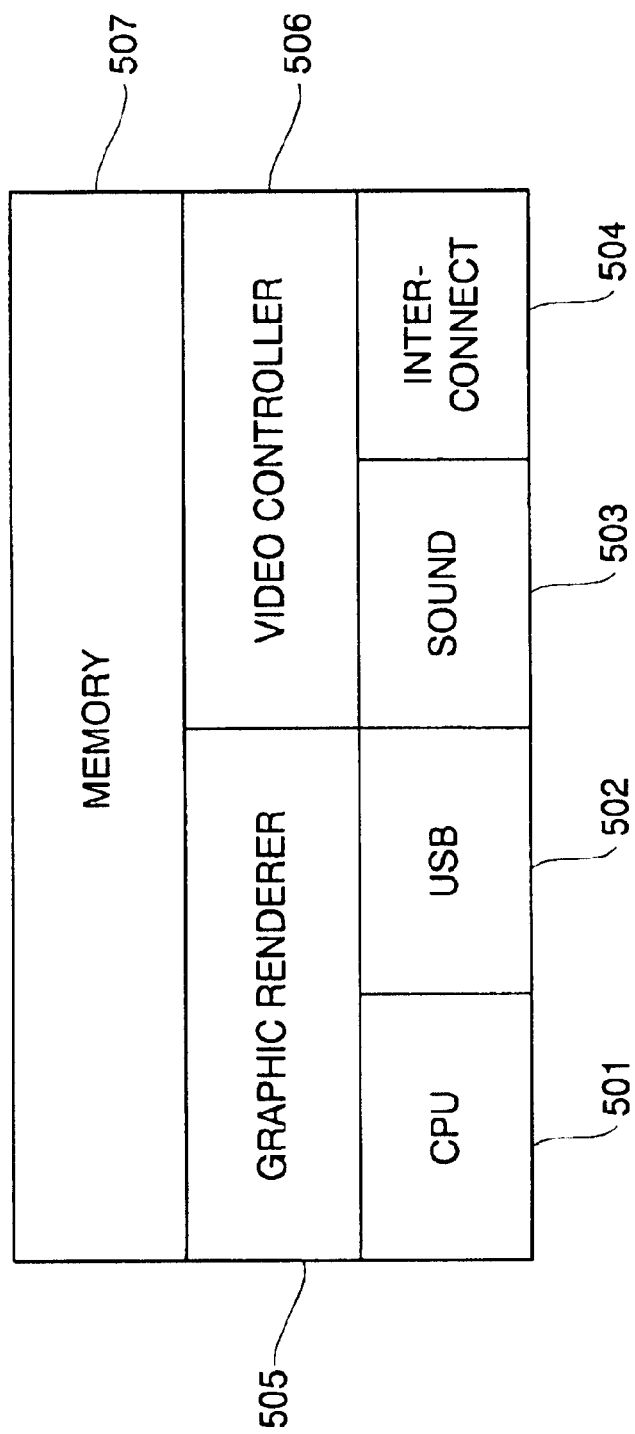
FIG. 5 illustrates a single chip HID embodiment of the present invention.

Alternatively, the HID can be implemented using a single chip solution as illustrated in FIG. 5. The single chip solution includes the necessary processing capability implemented via CPU 501 and graphics renderer 505. Chip memory 507 is provided, along with video controller/interface 506. A universal serial bus (USB) controller 502 is provided to permit communication to a mouse, keyboard and other local devices attached to the HID. A sound controller 503 and interconnect interface 504 are also provided. The video interface shares memory 507 with the CPU 501 and graphics renderer 505. The software used in this embodiment may reside locally in non volatile memory or it can be loaded through the interconnection interface when the device is powered.

Device Manager

The device manager is responsible for brokering devices that are attached to desktop units (HIDs) on the interconnection fabric for the purpose of remotely accessing the devices from various services. Since a desktop unit has no knowledge of most kinds of devices, it is not possible for it to understand the semantics of the device, and as a result, it is unable to directly control the device.

This means that device drivers should be provided by services running elsewhere on the interconnect. These services locate devices to be controlled through the device manager, and then they can directly control the device through the desktop unit. The device services are treated as the services described above in connection with the HID environment, so attention should be paid to connection with the desktop unit, session movement, and possible disconnection of the unit from the interconnect. Finally, since current peripheral bus architectures, such as USB, IEEE-1394, and PC bus support hot-plugging, both services and the device manager should be aware that devices could be connected, disconnected, or moved while the desktop unit is functioning and while being controlled by a service.

The device manager is also responsible for approving of services, keeping an inventory of devices and their controlling services, and locating devices on the interconnect. Different management scenarios are made available including a global device driver service (such as a Solaris™ nexus driver), a per-device driver, or a per-class driver. There are also different scopes provided, such as interconnect scope, desktop scope, and session scope.

Since the device management framework is focused on controlling devices, it does not perform desktop unit location services, or service and user authentication. These functions are performed by the session manager and the authentication manager respectively described in co-pending patent application Ser. No. 09/063,339 (now U.S. Pat. No. 6,223,289), entitled "Method and Apparatus for Session Management and User Authentication," and filed on Apr. 20, 1998, and patent application Ser. No. 09/289,788 (now U.S. Pat. No. 6,615,264), entitled "Method and Apparatus for Remotely Administered Authentication and Access Control Services," filed on Apr. 9, 1999, and both assigned to the assignee of the present application. Device drivers in this context are services that join a session in the way described in the co-pending applications, find their devices using the device manager and deal with the device directly using a protocol with desktop unit.

Device management controls accessibility of devices to services, thus to users and user programs. It is flexible enough to handle a wide variety of session and service scenarios from individual devices to all of the devices addressed by the desktop unit. This is done by first establishing a connection with the desktop unit using the standard session management services.

Block Diagram

Figure 2:
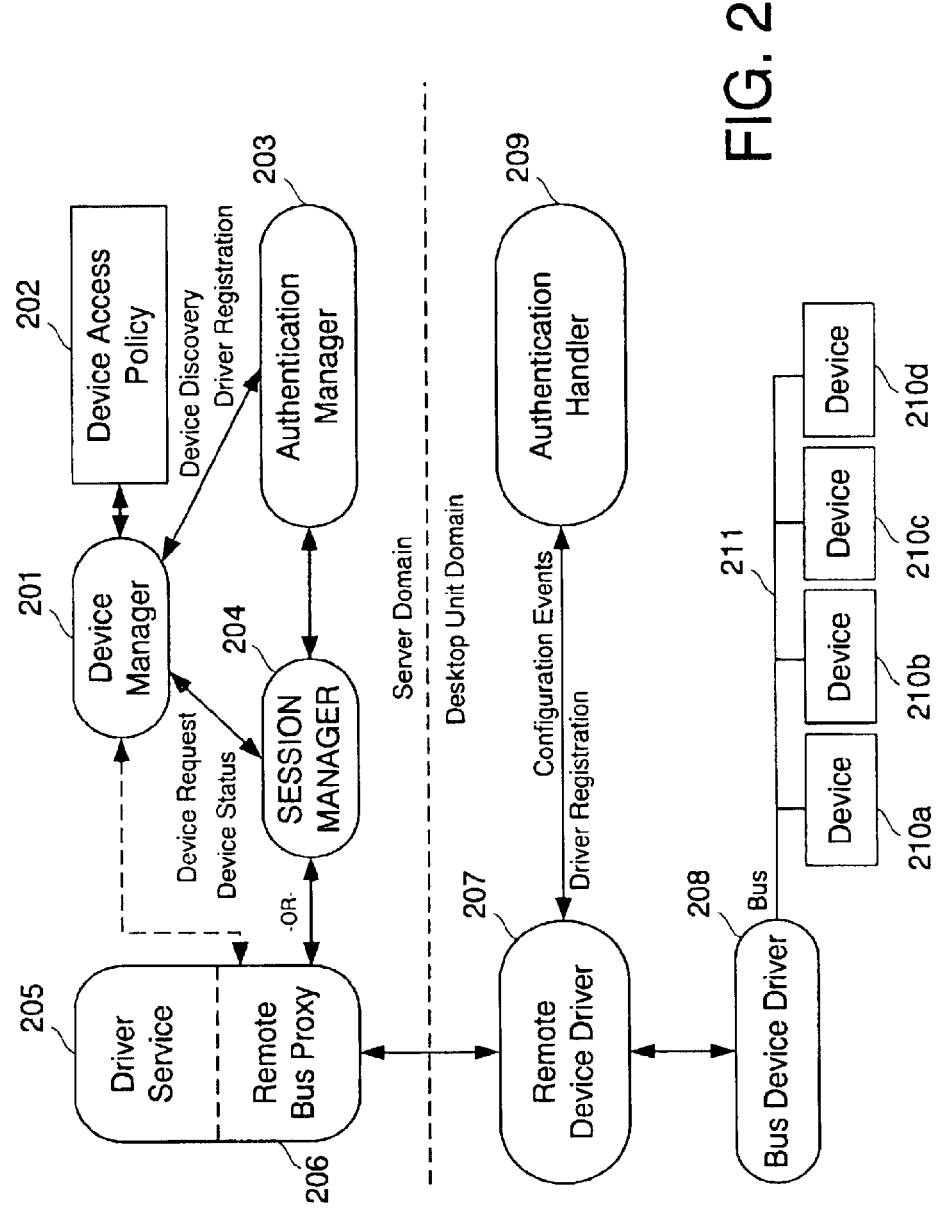
FIG. 2 illustrates an embodiment of the present invention.

FIG. 2 gives a block diagram of the overall remote desktop architecture with device management included. Components include services 205, the session manager 204, the authentication manager 203, the authentication handler 209 on the desktop side and the bus device driver 208. Also included are the remote device proxy 206, the device manager 201, the remote device driver 207, and devices 210A–210D coupled to bus 211.

The session manager 204 knows which services are associated with a particular session and manages connections with the desktop with the help of the authentication manager 203. The authentication manager 203 knows which user is requesting access and which session to associate with that user.

The device manager 201 uses the association between the user, session and desktop to map device services 205 to particular devices connected to particular desktop units. In the process of doing this, the device manager 201 can check a policy list 202 to compare what the service is asking for and the user (session) with an administrative policy for device access permission. If appropriate, then the device manager 201 registers the driver service with the remote device driver 207, and starts passing device discovery configuration events to the service.

Since the device manager 201 controls the service with respect to device attachment, the device manager 201 can inform the service of device loss when a session ends, and, to enforce this, can inform the desktop unit that no more control of a particular device is permitted by a particular service. If the service is controlling more than one device, then it may still be capable of controlling the other devices.

In one embodiment, there is a logically single device manager 201 much like there is a single session manager 204 and authentication manager 203 per interconnect domain. This means that there are single connections between the device manager 201 and each of the session manager 204 and the authentication manager 203. The driver service connects to the session manager 204 as would any service. It may be possible to plumb the device manager 201 between the session manager 204 and driver services to add the device management functionality to session services.

The remote device driver 207 is a standard device driver hosted by the bus device driver 208. The remote device driver 207, however, emulates a number of device drivers for the purposes of remote access, so it is likely to own all but a few of the devices 210A–210D on the desktop unit. As a result, the remote device driver 207 is responsible for keeping track of which remote device services 205 go to which devices that are exposed at the bus device driver 208. Additionally, the remote device driver 207 picks up configuration events from the bus device driver 208 and reports them to the device manager 201 for possible connection to a driver service.

Finally, the remote device driver 207 has the ability to permit and deny device and unit access by driver services. It maintains filters (given to it by the device manager 201) of interested services that are directly connected to it as well as a generic filter to report devices that might not be session-specific.

The authentication manager 203 maintains (possibly intermittent) connections with each of the desktop units for the purposes of authenticating users. This connection is used to additionally pass configuration information to and from the remote device driver 207. This connection is not required to be full-time because it is only needed when a session closes down (and then when a session-based policy is in effect), and when configuration events occur for devices which do not currently have a service controlling them.

The connection between the remote device driver 207 and the driver service is for communicating directly with the device and reporting errors, device disconnection, or loss of permission. This connection can be intermittent because the connection may be lost when a session changes or when a device is no longer available.

The bus type determines the protocol between the service (the bus proxy 206) and the remote device driver 207. The remote device driver's architecture and interface to the bus driver is also determined by the bus driver. Finally, the device description format, parts of the device ownership policy, and address space are also controlled by the bus type.

It is assumed that it is possible to track a user's authentication record from a session so it is possible to provide access to devices and units based on user identity. It is also assumed that it is possible to derive the desktop unit interconnect address from a session to enable communication with the desktop unit, to provide access to devices based on the identity of the desktop unit, and to track device assets based on desktop unit.

Device Manager 201

The Device manager 201 is responsible for brokering devices to services. In doing this, it needs to intercede between the remote device driver 207 and the driver service. The following is a step-by-step procedure for permitting a driver service to access a remote device:

1. When a device request (register) is received from the driver service, it is compared to the device access policy by comparing each field of the request to the policy. If there is a field that is specified in the policy (e.g. has a specific value and is not wild-carded), and the field does not match the field in the request, then the request is rejected. Incomplete matches are enabled for the class, model, and serial number.

2. The attached device data is scanned for a match with the device request. Device requests match devices for the purpose of reporting back to the driver service. If there is an attached device that matches, then a device status (connect) message is sent to the driver service. Otherwise, no response is generated at this time.

3. A received device request (register) is stored in the list of registered services.

4. If a driver services wishes to be the configuration master of the device, it requests configuration write permission with a device request (configure) message. If there is no current configuration service, then the attached device data is updated and a driver registration (configure) message is sent to the desktop unit. Otherwise, the request is rejected.

5. If the driver service wishes to use a particular device unit, then a device request (allocate) is received from the service which signifies the server connection number (e.g. Server socket) to be used for unit connection to this driver service. Otherwise, the device (or unit) remains available for other services to allocate.

6. When a unit is allocated, then a driver registration (allocate) message is sent to the desktop unit.

7. When a Device discovery message is received, then the device is added or removed from attached device data.

8. When a device is added to the device data, the selection data is re-scanned for a match, and device status (connect) messages may be generated if there are matches.

9. Receiving a device request (allocate) renews the lease on a device unit.

10. When a device is removed from the device data, the selection data is re-scanned for matching services. If a service's selection lifetime is met, then the service's registered selection is removed.

11. When the connection with the driver service is lost, or a device request (unregister) is received, or the selection lifetime criterion is met, then the service's registered selection is removed.

12. If a registered selection is removed, then a driver registration (remove) message is sent to the desktop unit.

13. When the connection to the desktop unit is lost, the devices connected to that unit are removed from the list. Any interested services may have their registered selections removed if the selection lifetime is met.

14. If a service's lease on a device expires or a session lease expires, then a Driver Registration (remove) message is sent to the desktop unit.

Device Access Policy

The device access policy is an external file or database that is compared to device access requests to determine if a request is valid. It contains the following fields:
a. user (session),
b. server (e.g. IP address),
c. device selection information:
  i. class (or none),
  ii. vendor (or none),
  iii. model (or none),
  iv. serial number (or none).
d. selection scope (session desktop unit, interconnect global),
e. selection lifetime (session connected, device disconnect, permanent),
f. connection lifetime (session connected, session delayed, device lease),
g. maximum lease duration (in case session delayed or device lease is enabled).

Any of the fields can be left blank, meaning any value in the request will match that field. In order for a complete match, all specified fields should be matched.

Class, model, and serial number allow incomplete matching if the amount specified in the policy matches the first part of the request string.

Unions are allowed for lifetime values (e.g. session connected or permanent).

Device Access Request

The device access request is used by driver services to register and unregister device searches and set the communication capabilities with the desktop unit. The server address and the session number are derived from the session manager 204 connection. This request has several forms: (parenthesized expressions are examples from the USB configuration specification).
a. register:
  i. class,
  ii. vendor, iii. model,
iv. serial number,
v. selection scope,
vi. selection lifetime,
vii. connection lifetime,
viii. lease duration.
b. configure:
  i. desktop unit address,
  ii. device address,
  iii. service socket,
c. allocate:
  i. desktop unit address,
  ii. device address,
  iii. unit address,
  iv. service socket.
d. release
  i. class,
  ii. vendor,
  iii. model,
  iv. serial number,
  v. selection scope,
  vi. selection lifetime,
  vii. connection lifetime.

Device Discovery

Device discovery is used by the desktop unit to report when devices change state—connected, disconnected, owned, released. The desktop unit interconnect address is derived from the authentication manager 203 connection. This request has several forms:

a. connect (sent on connection, ownership or release):
  i. bus type (e.g. USB, IEEE-1394),
  ii. device address,
  iii. device class (bDeviceClass+bDeviceSubClass+bDeviceProtocol, Module_Spec_Id_+Module_SW_Version),
  iv. vendor (idVendor, Module_Vendor_Id),
  v. model (idProduct+bcDevice, Module_HW_Version),
  vi. serial number (iSerialNumber, Module_Unique_Id),
  vii. configuring server address,
  viii. configuring server socket number,
  ix. Units (Interfaces in USB): class, controlling server address, controlling server socket number.
b. disconnect:
  i. bus type,
  ii. device address.

Processing

1. Tracks the connection and disconnection of devices for all desktop units on an interconnect.
2. Keeps a list of all devices currently attached devices on all functioning desktop units on an interconnect. This list includes (example mappings: USB, IEC/ISO 13213 [e.g. IEEE-1394]):
a. Desktop unit interconnect address,
b. bus type (e.g. USB, IEEE-1394),
c. device address,
d. device class (bDeviceClass+bDeviceSubClass+bDeviceProtocol, Module_Spec_Id+Module SW_Version),
e. vendor (idVendor, Module_Vendor_Id),
f. model (idProduct+bcdDevice, Module_HW_Version),
g. serial number (iSerialNumber, Module_Unique_Id),
h. configuring service,
i. configuring service socket number,
j. Units (Interfaces in USB):
  i. class (bInterfaceClass+bInterfaceSubClass+bInterfaceProtocol, Unit_Spec_Id+Unit_SW_Version),
  ii. controlling service,
  iii. controlling service socket number.
3. keeps a list of all driver services registering interest in devices:
a. user (Authentication manager 203 record, session),
b. server (e.g. IP address),
c. other identification information (e.g. process ID, program name provided by the service),
d. device selection request:
  i. class (or none),
  ii. vendor (or none),
  iii. model (or none),
  iv. serial number (or none),
e. selection scope (session desktop unit, interconnect global),
f. selection lifetime (session connected, device disconnect, permanent),
g. connection lifetime (session connected, session delayed, device lease),
h. lease duration.
4. Informs driver services when a candidate device becomes available whether or not it is in use by another service (all approved services can read a device's configuration space).
5. Accepts device access requests from services. Operational device access requests apply only to individual units so multiple services can control a single device.
6. Controls device access permissions.
7. Compares the device access request to the device access policy.
8. After authorization, registers a driver with a desktop unit.
9. In case of failure, all interested services are reconstructed and each desktop unit queried on a time-available basis for its current list of devices and owning services. External programs can snapshot the device manager 201 state e.g. for inventory purposes, but that is not considered core or critical device manager 201 functionality. Device manager 201 failure does imply the temporary loss of the ability to connect some services to some devices.
10. Driver services may register before the particular device requested is available (e.g. in use or disconnected).

Outputs

1. Device Status

The device status message is sent to the driver service when a device is connected or ownership changes. Disconnect events come directly from the desktop unit. The message includes the data:
a. Desktop unit interconnect address,
b. bus type (e.g. USB, IEEE-11394),
c. device address,
d. device class (bDeviceClass+bDeviceSubClass+bDeviceProtocol, Module_Spec_Id+Module SW_Version),
e. vendor (idVendor, Module_Vendor_Id),
f. model (idProduct+bdcDevice, Module_HW_Version),
g. serial number (iSerialNumber, Module_Unique_Id), h. configuration available, not available, owned,
i. Units (Interfaces in USB):
  i. class,
  ii. control available, not available, owned.
2. Driver Registration The driver registration message is sent to the desktop unit to attempt to allocate a device on behalf of a service. There are three forms to this message:
a. configure—sets configuration control to a particular service,
b. unconfigure—removes configuration control from a particular service,
c. allocate—sets unit control to a particular service,
  d. remove—removes unit control from a particular service.

All three have the same arguments:
a. bus type,
b. device address,
c. unit address (zero for configure and unconfigure),
d. server address,
e. server socket number.

Driver Service

The driver service is the client to device management, and created by an external party.

The driver service needs to completely control the device; e.g., Implement a complete device driver. As such, it is the responsible party for creating device requests. The driver service uses the remote bus proxy 206 to help structure itself with respect to a session and handling the device protocol.

After describing a controllable device to the device manager 201, the driver service waits for device status messages for the purpose of collecting the desktop unit address and the device number. When the device status message is received, then the driver service is free to read the device's configuration space using the remote bus proxy 206. If the device is found to be inappropriate, the driver service waits for more device status messages, and optionally closes the socket it used to access the desktop unit. If the connection is still open and the device is unplugged, then the driver service receives remote device data that reflects this.

If the driver service wishes to fully access the device, it should first determine if there is a current configuration. If there is, then it simply can start sending device requests to open units. If there is not a current configuration, then the service needs to become the configuration owner first. If the driver service is the configuration owner, then it should set the configuration if the bus and/or device require that to be done.

If there are already open device units, then it is possible that the original configuration owner has given up control of the configuration, but the configuration cannot change until all of the units are closed.

After a unit is opened, then read and write operations can happen on any of the conduits associated with the unit; the driver is the sole owner of that unit.

If a session state change is detected, the device manager 201 assumes that the driver service will follow its policy and either continue to service device status requests and control the device, or drop the device and wait for the session to establish itself with a new desktop unit. The device manager 201 additionally enforces this.

When the driver service is done with a device, it releases all of its units using a device request (release) command. If it was the configuration owner, then it should release its configuration using a similar command. If the lease expires on the device, the socket is closed, or if the device is disconnected, then all of this happens automatically at the desktop unit.

Inputs
1. Device Status.
2. Bus-specific remote device data.

Processing
1. Device-specific services register from within the context of a session, even if that is a special administrative session.
2. The driver service is responsible for describing the devices it can drive. This can be more than one device.
3. It is acceptable for driver services to discovery a device and to probe its configuration space without either becoming the configuration owner or opening any units.

Outputs
1. Device Requests,
2. Bus-specific remote device data.

Remote Bus Proxy 206

The remote bus proxy 206 is an easy-to-use interface for both the device manager 201 and the remote device driver 207. The remote bus proxy 206 converts function calls into protocol for both of these.

Since the remote bus proxy 206 handles the remote device driver 207, its interfaces are necessarily bus-specific. For an example of a remote device driver 207, refer to the USB remote proxy 206 interface below.

USB Bus Binding

Device Discovery Formats
1. bus type: USB=0x0001xxxx where 65536 USB buses are allowed.
2. device address:1–127.
3. device class (bDeviceClass+bDeviceSubClass+bDeviceProtocol): 24 bits, variable in 8-bit increments.
4. vendor (idVendor): 16 bits.
5. model (idProduct+bcdDevice): 32 bits, variable in 16-bit increments.
6. serial number: UNICODE string, optional, may vary according to LOCALE.
7. configuring service: IP address.
8. configuring service socket number: 16 bits.
9. Units (Interfaces in USB):
   a. class (bInterfaceClass+bInterfaceSubClass+bInterfaceProtocol): 24 bits, variable in 8-bit increments.
   b. controlling service: IP address.
   c. controlling service socket number: 16 bits.

Remote Device Protocol

Because all of the data for a session is being multiplexed onto a single socket, it is important to use a call-response protocol similar to the basic USB protocol. This keeps backpressure on the USE bus and not on the TCP connection because only one transaction at a time is allowed on an endpoint. The entire protocol is done in two phases. One to send data or commands and another to receive data or status. Only disconnect events are asynchronous (but you can have only one!).

The well-known port for USB transactions is 5498.

define UT_USB_PORT5498

The first data sent is a 16 bit magic number followed by a 16 bit command. After that, all data transfer is done in an even number of 4-byte words. The length of the command is derived from the command and then rounded up to make an even number.

```
#define UT_USB_MAGIC0x5554/* 'UT' */
typedef struct ut_usb_cmd {
    uint16_t magic;
    uint16_t cmd;
    uint16_t val;
    uint8_t addr;
    uint8_t endp;
} ut_cmd_t;
```

Val is an argument for the particular command, addr is the device address from 1–128, and endp is the endpoint (unit in Device Management parlaise) number from 0–15.

The IN command is used to request data from an endpoint, and for that data to be returned to the service. Val encoded the size of bytes of the desired read, or the amount of the data returned.

define UT_USB_IN0x0096

The STATUS command is used to return status for OUT commands, or error status for bad IN commands. Error codes are found in the val field and are TBD, but are extended from the OHCI transfer error codes. There will be special error codes to designate that the endpoint is inaccessable, and to designate that the device is inaccessable and/or disconnected if the endpoint is zero. Special error codes will not conflict with operational error codes.

define UT_USB_STATUS0x004b

The OUT command is used to write data directly to an endpoint. The length of the transfer is encoded in the val field. The response from the device is always with a status command define UT_USB_OUT0x0087

The SETUP command is for sending a control transfer. The 8 bytes immediately following the header describe the control command. Vat encodes the length of the data following and should exactly equal the value in bytes 6 and 7 of the control command. If the command is a read (bmRequestType & TRANS_READ), then vat should be zero.

```
                #define UT_USB_SETUP0x00b4
A.3        Remote Interface Proxy 206
typedef struct ut_ubus {
    char *session;
    char *target;
    nvSession nvsession;
    int sessioncnt;
    int net;
    ut_cmd_t cmd;
    uint8_t buf[2048]
} ut_ubus_t;
typedef struct ut_pipe {
    ut_ubus_t *ubusp;
    int dev;
    int endpt;
} ult_pipe_t;
ut_ubus_t *ut_usb_bus(char *session, char *target, int threaded);
void ut_usb_done(ut_ubus_t *ubusp);
ut_pipe_t *ut_usb_open(ut_ubus_t *ubusp, int dev, int endpt);
voit ut_usb_close(ut_pipe_t *pipep);
int ut_control_read(ut_ubus_t *pipep, int flags, int request, int value, int
```

-continued

```
    index, int length, uint8_t *data);
int ut_control_write(ut_pipe_t *pipep, int flags, int request, int value,
    int index, int length, uint8_t *data);
int ut_send_bulk(ut_pipe_t *pipep, uint8_t *data, int len);
int ut_receive_bulk(ut_pipe_t *pipep, uint8_t *data, int len);
int ut_register_hubeven(ut_ubus_t *ubusp,
        void (*) (ut_ubus_t *ubusp, void *arg, uint16_t val),
        void *arg);
int ut_register_interrupt(ut_pipe_t *pipep,
        void (*) (ut-Pipe_t *pipep, void *arg, int len),
        void *arg, int size, void *ptr);
ut_cmd_t *ut_usb_geteven(ut_ubus_t *ubusp);
```

Remote bus proxy 206 is responsible for sending requests and data to the device manager 201 and to the remote device driver 207. It also provides call-back routines for connect and disconnect events, and any other asynchronous event that the bus protocol dictates (e.g. USB interrupts).

Inputs
1. Device status,
2. Bus-specific remote device data.

Processing

Device manager 201 function should not be required to maintain current device connections. In case of device manager 201 failure, connecting should be retried. When a new connection is established, device request data should be sent to the device manager 201 for database rebuild.

Outputs
1. Bus-specific device semantics,
2. Device Request,
3. Bus-specific remote device data.

Remote device driver 207

The remote device driver 207 maintains relationships between the device manager 201, the requesting services and the actual bus device driver 208. It can tap all configuration activity on the bus. Its two primary functions are to map configuration information to and from the device space and to convert protocol to and from device data. When a device is plugged in, unplugged, or the ownership of a device changes, the remote device driver 207 should send a device discovery message.

When a device is unplugged or becomes inaccessible to a particular service, then it should send an unplug message over the socket to the driver service and disable that device connection for that service (although it should not remove all of the device connections if they are not all invalid). If the connection to the driver service is lost, it should free all of the resources being held by that service and notify the device manager 201.

When the device manager 201 sends a driver registration message, the remote device drive 207 enables the designated port for the designated resource. If the designated resource is not available, the remote device driver 207 sends a device discovery message to the device manager 201 reminding it who currently owns that resource. If, the resource is available, the resource is allocated and enabled, and a device discovery message is sent to the device manager 201 to indicate the new owner.

The device manager 201 will, from time to time, send driver registration messages indicating that a service no longer has access to a device or unit. In this case, that resource is deallocated, a disconnect message is sent to the driver service, and a device discovery message is sent to the device manager 201 to indicate that the resource has been released.

If the connection to the device manager 201 is lost, then this is retried until connection is reestablished, then all of the current device data is sent to the device manager 201 using device discovery messages.

Inputs
1. Bus-specific commands and data.
2. Driver Registration.

Processing
1. In order to realize one connection per service per desktop unit, it is necessary to perform flow control at the bus level rather than at the connection level.
2. For accounting purposes, a remote device driver 207 reports devices which it does not manage or are currently not connected to a service to the device manager 201.
3. It is possible for the configuration space of all devices, including devices used internally to the desktop unit, to be queried, but if a device is in use (either locally or remotely) it is not possible to change the configuration (other than to connect to a service in the case of an unused device) nor to transfer operational data to or from these devices.
4. If there are already open device units, then it is possible that the original configuration owner has given up control of the configuration, but the configuration cannot change until all of the units are closed.
5. Remote device driver 207 should be able to deny connections to devices from services directly. This is important for policy enforcement.
6. Device manager 201 function should not be required to maintain the list of current device connections.
7. In case of device manager 201 failure, connecting should be retried. When a new connection is established, all device discovery data should be sent to the device manager 201 for database rebuild.
8. Informs all interested driver services when a device is disconnected whether or not they have exerted any control over the device.

Outputs
1. Bus specific status and data.
2. Device Discovery events.

External Interface Requirements
1. The Device manager 201 uses the authentication manager 203 connection for a secure, and ubiquitous connection to all desktop units.
2. The device manager 201 uses the session manager 204 connection to be sure that the session that is making requests is currently attached to the desktop unit it wants to control.
3. The device manager 201 does not authenticate individual users. It is up to programming on the device manager 201 target platform to provide a connection into the device manager 201 which can authorize individual users.

Communication Interfaces
1. All remote interfaces use sequenced, reliable byte streams.
2. All communications interfaces depend on the installed networking infrastructure, which is not specified. Initial versions are for TCP/IP at all interfaces.

What is claimed is:

1. A system for providing remote access to a peripheral device located on a desktop unit domain, said system comprising:

a network;

at least one driver service at said server domain, said at least one driver service requesting said peripheral device;

a remote bus proxy at said server domain, said remote bus proxy communicating with said peripheral device;

a remote device driver at said desktop unit and locally coupled to said peripheral device, said remote device driver configured to track said peripheral device being associated with said at least one driver service; and a device manager at said server domain, said device manager controlling communications over said network between said at least one driver service at said server domain and said remote device driver at said desktop unit domain;

wherein said device manager is further adapted to approve requests to read or send data to said peripheral device via said remote device driver and to control accessibility to said peripheral device via said remote device driver.

2. The system of claim 1, wherein said network comprises a wide area network and wherein said device manager is further adapted to discover said at least one driver service, enable said at least one driver service to use said peripheral device via said remote device driver, notify non-associated driver services of an availability of said peripheral device, and track a connection over said network of said peripheral device with said at least one driver service.

3. An apparatus for providing access to a plurality of devices located on a desktop domain over a network, comprising:

a desktop domain having a plurality of devices;

a network;

a server domain coupled to said desktop domain via said network;

a remote device driver locally connected to said plurality of devices;

a plurality of driver services configured to remotely control one or more of said plurality of devices, wherein said remote device driver tracks which one or more of said plurality of driver services communicate with which of said one or more of said plurality of devices; and a device manager configured to register said one or more of said plurality of driver services with said remote device driver to access said one or more of said plurality of devices;

wherein said device manager is further configured to approve requests to read data from said one or more of said plurality of devices via said remote device driver, to approve requests to send data to said one or more of said plurality of devices via said remote device driver, and to control accessibility to said one or more of said plurality of devices via said remote device driver;

wherein said plurality of driver services and said device manager reside in said server domain;

wherein said plurality of driver services and said device manager are coupled across said network to said remote device driver; and wherein said remote device driver resides in said desktop unit domain.

4. The apparatus of claim 3, wherein said desktop unit domain comprises a plurality of Human Interface Devices (HIDs) locally connected to said plurality of devices, wherein said plurality of devices are peripherals of said plurality of HIDs, and wherein said server domain comprises a plurality of servers.

5. The apparatus of claim 4, wherein said plurality of devices are separated from said server domain via said network and wherein said network comprises a wide area network.

6. The apparatus of claim 5, wherein said plurality of HIDS can only operate said plurality of devices via said plurality of driver services residing in said server domain.

7. The apparatus of claim 3 wherein said remote device driver resides in a Human Interface Device (HID) for providing a user interface to operate said one or more of said plurality of devices.

8. The apparatus of claim 7, further comprising:
a bus device driver locally coupling said remote device driver to said one or more of said plurality of devices; and
a bus proxy remotely coupling said one or more of said plurality of driver services to said remote device driver.

9. The apparatus of claim 8, wherein said one or more of said plurality of devices are locally connected to said HID and wherein said HID can only operate said one or more of said plurality of devices via said plurality of driver services.

10. The apparatus of claim 9, further comprising:
a session manager configured to associate one or more sessions with said one or more of said plurality driver services; and
an authentication manager configured to associate said one or more sessions with said HID.

11. The apparatus of claim 7, wherein said device manager is configured to notify a first driver service of a loss of a network connection to a first device when an associated session of said HID ends.

12. The apparatus of claim 11, wherein said device manager is further configured to notify said remote device driver that said first driver service is no longer permitted to control said first device.

13. The apparatus of claim 12, wherein said remote device driver is configured to notify said device manager of a configuration change in said one or more of said plurality of devices.

14. The apparatus of claim 3, wherein said device manager is further configured to enforce a device access policy for registering said one or more of said plurality of driver services.

15. The apparatus of claim 14, wherein said device manager is further configured to locate said one or more of said plurality of devices and to maintain an inventory of said one or more of said plurality of devices and said one or more of said respective controlling driver services.

16. The apparatus of claim 3, wherein said remote device driver comprises a filter for permitting and denying access by one or more of said plurality of driver services and wherein said filter is provided by said device manager via said network.

17. A method for providing access to one or more remote devices over a network, comprising:
receiving by a device manager at a server domain of a device request from a driver service at said server domain;
registering by said device manager of said driver service with a remote device driver at a desktop domain; and
communicating by said driver service with an associated remote device of one or more remote devices at said desktop domain via said remote device driver;
tracking said associated remote device association with said driver service via said remote device driver;
wherein said registering by said device manager of said driver service comprises controlling accessibility to said associated remote device using said remote device driver, approving requests to read from said associated remote device using said remote device driver, and approving requests to send data to said associated remote device using said remote device driver.

18. The method of claim 17, further comprising sending device configuration information by said remote device driver to said device manager.

19. The method of claim 18, further comprising locally exposing said remote device to said associated remote device driver via a bus device driver.

20. The method of claim 19, further comprising:
associating a session with said driver service via a session manager; and
associating said session with a Human Interface Device (HID) at said desktop unit domain via an authentication manager.

21. The method of claim 20, wherein said associated remote device is locally connected to said HID and wherein said HID operates said associated remote device via said driver service.

22. The method of claim 17, wherein said registering said driver service by said device manager of said driver service further comprises enforcing a device access policy.

23. The method of claim 17, further comprising maintaining in said remote device driver an association between said associated remote device and said driver service.

24. The method of claim 17, further comprising maintaining by said device manager of a first inventory of remote devices located locally on a Human Interface Device (HID) at said desktop unit domain and a second inventory of a respective driver services at said server domain controlling said inventoried remote devices.

25. The method of claim 17, further comprising notifying said driver service by said device manager of a loss of a network connection to said associated remote device.

26. The method of claim 25, wherein said loss of said network connection to said associated remote device is in response to the closing of an associated session by a user on a Human Interface Device (HID) at said desktop unit domain.

27. The method of claim 26, further comprising notifying said remote device driver by said device manager that said driver service is no longer permitted to control said associated remote device.

28. The method of claim 27, wherein said network connection comprises a wide area network connection.

29. An apparatus for providing access to one or more peripheral devices over a network, comprising:
a wide area network;
a plurality of peripheral devices;
a Human Interface Device (HID) locally coupled to said peripheral devices, said HID comprising a remote device driver coupled to said plurality of peripheral devices; and a server coupled to said HID over said wide area network, said server comprising:
  a plurality of driver services configured to remotely control said plurality of peripheral devices for said HID over said wide area network, wherein said remote device driver tracks which one or more of said plurality of driver services communicate with which one or more of said plurality of peripheral devices; and
  a device manager configured to register said one or more of said plurality of driver services with said remote device driver to access said one or more of said plurality of peripheral devices;
wherein said device manager is further configured to approve requests to read data from said one or more of said plurality of peripheral devices via said remote device driver, to approve requests to send data to said one or more of said plurality of peripheral devices via said remote device driver and to control accessibility to said one or more of said plurality of peripheral of remote devices via said remote device driver.

30. The apparatus of claim 29 wherein said plurality of driver services are separated from said HID via said wide area network.

31. The apparatus of claim 30, wherein said device manager is also configured to discover said one or more of said plurality of driver services, to enable said one or more of said plurality of driver services to use said one or more of said plurality peripheral devices via said remote device driver, to notify other driver services of an availability of said one or more said plurality of peripheral devices with said one or more of said plurality of driver services.

\* \* \* \* \*